United States Patent
Kobayashi et al.

[11] Patent Number: 6,088,755
[45] Date of Patent: Jul. 11, 2000

[54] EXTERNAL STORAGE APPARATUS WHICH CAN BE CONNECTED TO A PLURALITY OF ELECTRONIC DEVICES HAVING DIFFERENT TYPES OF BUILT-IN INTERFACE WITHOUT USING A CONVERSION ADAPTER

[75] Inventors: Toshiharu Kobayashi, Tokyo; Akihiro Kikuchi, Chiba; Takumi Okaue, Kanagawa, all of Japan

[73] Assignee: Sony Corporation, Tokyo, Japan

[21] Appl. No.: 09/083,367

[22] Filed: May 21, 1998

[30] Foreign Application Priority Data

Jun. 4, 1997 [JP] Japan ................................. 9-146915

[51] Int. Cl.⁷ ............................................. G06F 13/14
[52] U.S. Cl. ............................ 710/129; 710/63; 710/101
[58] Field of Search .................................. 710/129, 100, 710/101, 63, 126, 128; 395/306, 308, 309

[56] References Cited

U.S. PATENT DOCUMENTS

| | | | |
|---|---|---|---|
| 3,828,325 | 8/1974 | Stafford et al. | 710/63 |
| 4,500,933 | 2/1985 | Chan | 360/69 |
| 4,972,470 | 11/1990 | Farago | 380/3 |
| 5,349,649 | 9/1994 | Iijima | 709/228 |
| 5,420,412 | 5/1995 | Kowalski | 235/492 |
| 5,457,784 | 10/1995 | Wells et al. | 710/9 |
| 5,481,696 | 1/1996 | Lomp et al. | 710/8 |
| 5,581,708 | 12/1996 | Iijima | 710/11 |
| 5,629,687 | 5/1997 | Sutton et al. | 340/825.37 |
| 5,748,915 | 5/1998 | Iijima | 710/105 |
| 5,774,741 | 6/1998 | Choi | 710/2 |
| 5,802,325 | 9/1998 | Roux | 710/102 |
| 5,832,244 | 11/1998 | Jolley et al. | 710/129 |
| 5,870,626 | 2/1999 | Lebeau | 710/11 |
| 5,928,347 | 7/1999 | Jones | 710/129 |
| 5,964,852 | 10/1999 | Overton | 710/62 |

FOREIGN PATENT DOCUMENTS

0 513 507 A1  11/1992  European Pat. Off. .

*Primary Examiner*—Thomas C. Lee
*Assistant Examiner*—Abdelmoniem Elanin
*Attorney, Agent, or Firm*—Frommer Lawrence & Haug, LLP; William S. Frommer

[57] ABSTRACT

The present invention enables connection and a high-speed access to a plurality of electronic apparatuses having different types of built-in interfaces.

The present invention provides an external storage apparatus including: storage means 22; an interface controller A21 and an interface controller B24, each having a different type of built-in interface control block for carrying out a data writing and/or reading into/from the storage means 22; and connection means 26 for selecting and connecting one of the interface controller A21 and the interface controller B24 to the electronic apparatus. It is preferable that the connection means 26 be constructed so as to select one of the interface controller A21 and the interface controller B24 according to a control from the electronic apparatus.

14 Claims, 4 Drawing Sheets

EXTERNAL STORAGE APPARATUS WHICH CAN BE CONNECTED TO A PLURALITY OF ELECTRONIC DEVICES HAVING DIFFERENT TYPES OF BUILT-IN INTERFACE WITHOUT USING A CONVERSION ADAPTER

BACKGROUND OF THE INVENTION

1. Field of the Invention

The present invention relates to an external storage apparatus for storing a data from an electronic device. More particularly, the present invention relates to an external storage apparatus having a plurality types of built-in interface control blocks enabling a high-speed access regardless of the type of the interface control block.

2. Description of the Prior Art

Conventionally, when an electronic apparatus such as a computer, for example, is used as a main storage device, an external storage apparatus is used as an additional capacity to this main storage apparatus. As this external storage apparatus, there can be exemplified a magnetic tape, a magnetic disc, magneto-optical disc, paper tape, card type memory, and the like. Among them, the card type memory is especially widely used because of its comparatively high transfer rate.

The card type memory has a built-in storage means and interface control block for writing and reading a data to/from the storage means. By connecting the interface control block to an interface in the electronic apparatus serving as the main storage device, the card type memory functions as an external storage apparatus of the electronic apparatus.

However, if the interface in the electronic apparatus and the interface control block in the card type memory have different interface types which can be controlled, the electronic apparatus cannot carry out direct writing and/or reading of a data into/from the card type memory.

To cope with this, as shown in FIG. 1, it is necessary to employ a conversion adapter 54 for connection between an electronic apparatus (not depicted) and a card type memory 53 including an interface controller C51 having a built-in predetermined interface control block and storage means 52 consisting of a plurality of memories such as flash memory 52a, 52b, or the like.

The conversion adapter 54 contains an interface controller C56 having a built-in interface control block capable of controlling the interface in the electronic apparatus; and a built-in serial interface 57, for example, for matching the aforementioned interface control block with the interface control block in the card type memory 53.

However, when the conversion adapter 54 is used, a conversion processing is required by the interface before reaching the flash memories 52a, 52b in the card type memory 53 from the electronic apparatus, which increases the access time.

SUMMARY OF THE INVENTION

It is therefore an object of the present invention to provide an external storage apparatus which enables a high-speed access and can be connected without the use of a conversion adapter to a plurality of electronic apparatuses having different types of built-in interface.

In order to achieve the aforementioned object, the external storage apparatus according to the present invention serves for storing a data from an electronic apparatus and includes: storage means; interface control blocks of a plurality of types for carrying out a data writing and/or reading into/from the storage means; and connection means for selecting and connecting one of the plurality of interface control blocks to the electronic apparatus.

Note that in the external storage apparatus according to the present invention, it is preferable that the aforementioned connection means be controlled from the electronic apparatus, so as to select one of the interface control blocks of plurality of types.

In the external storage apparatus according to the present invention for storing a data from an electronic apparatus, there are provided storage means; interface control blocks of a plurality of types for carrying out a data writing and/or reading into/from the storage means; and connection means for selecting and connecting one of the plurality of interface control blocks to the electronic apparatus. Consequently, it is possible to connect the external storage apparatus to a plurality of electronic apparatuses having different types of built-in interfaces, without using an adapter.

DETAILED DESCRIPTION OF THE PREFERRED EMBODIMENTS

Hereinafter, description will be directed to an embodiment of the present invention with reference to the attached drawings. It should be noted that explanation will be given on the resent invention applied to a card type memory.

Figure 1:
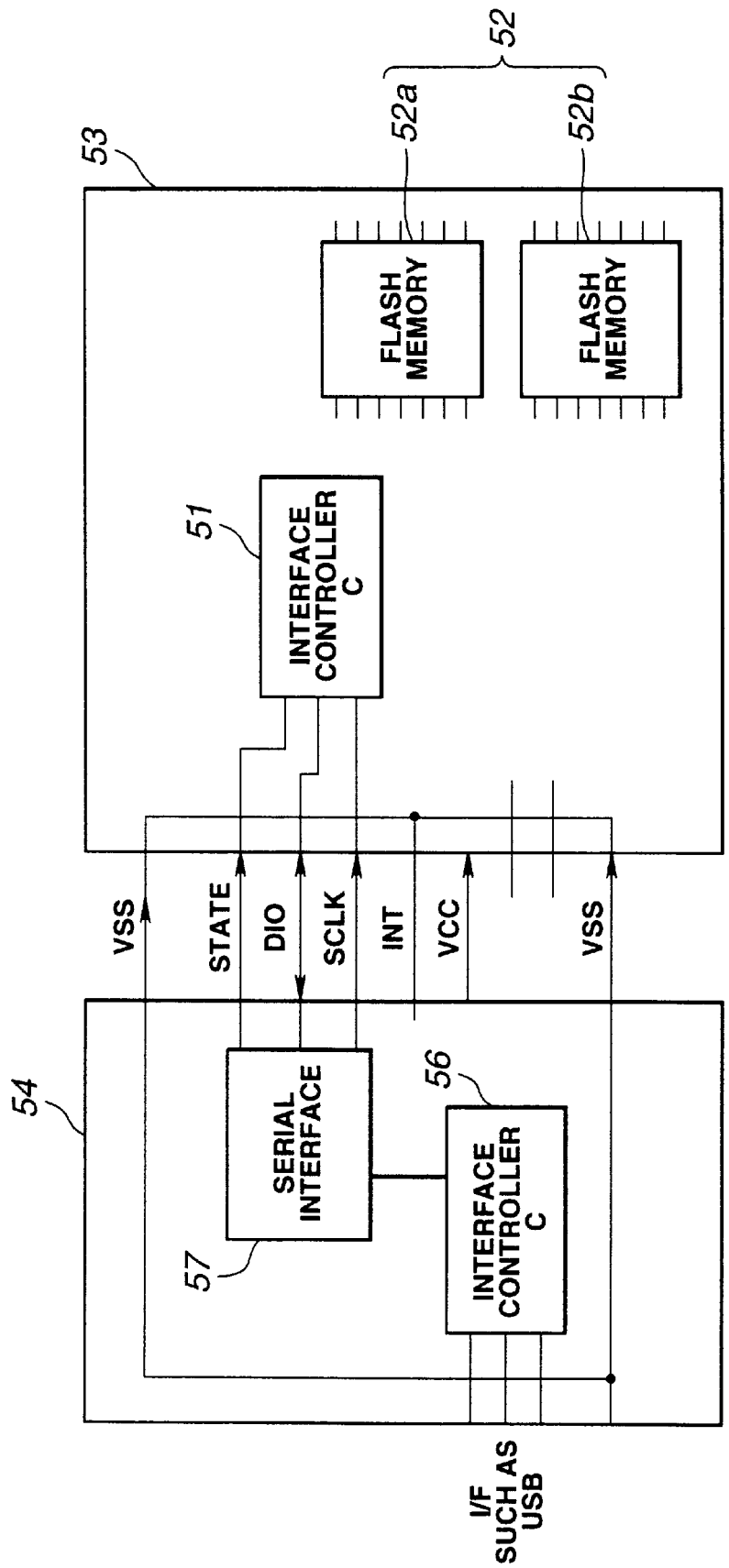
FIG. 1 is a block diagram showing a conventional card type memory and an adapter.
Figure 2:
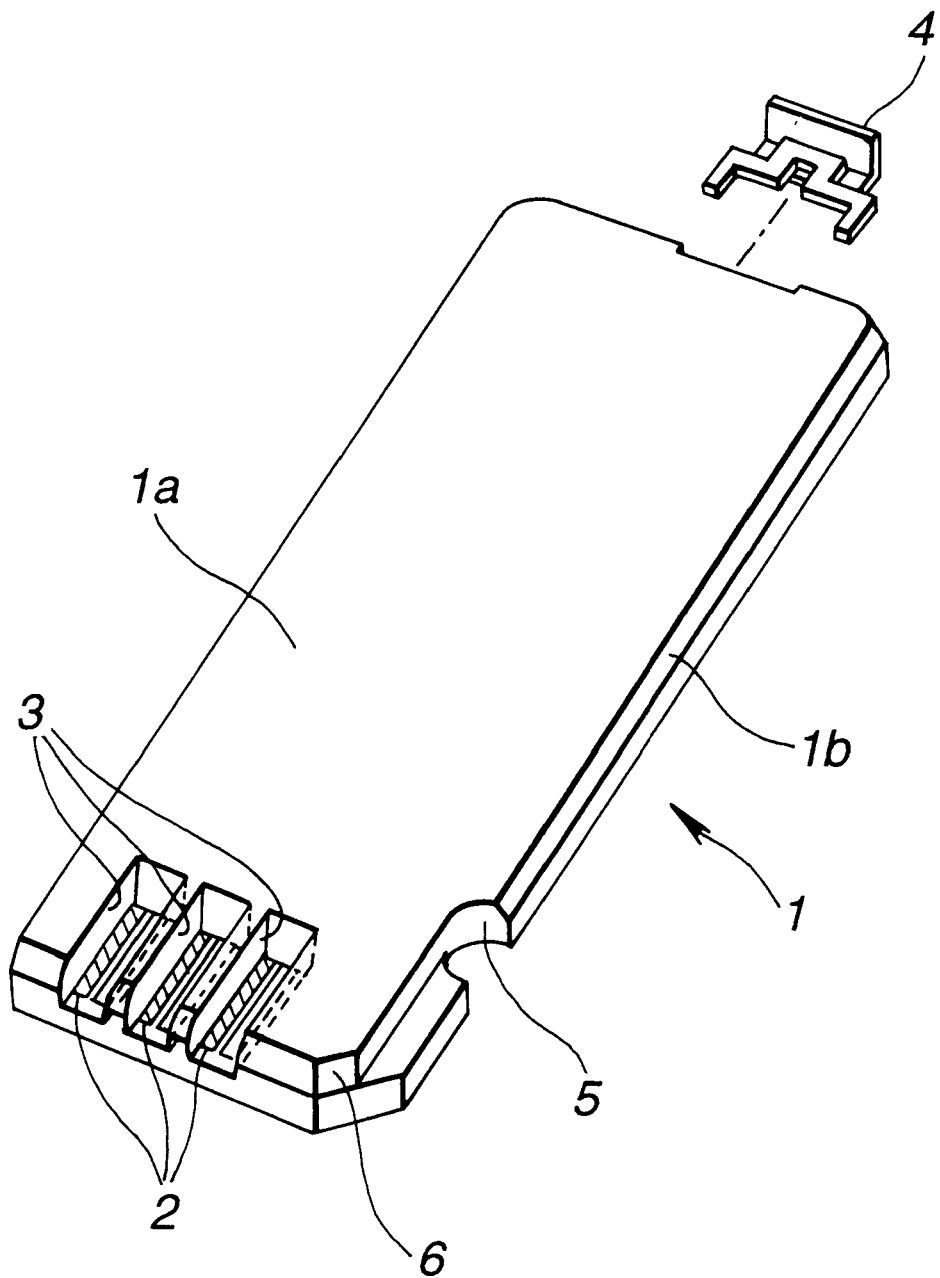
FIG. 2 is a perspective view showing a card type memory according to the present invention.

That is, the card type memory according to the present invention serves for storing a data from an electronic apparatus (not depicted) such as a computer, a still image pickup apparatus, acoustic apparatus, and a video apparatus. As shown in FIG. 2, the card type memory 1 according to the present embodiment is formed from a synthetic resin into a thin card shape having a rectangular plane.

Furthermore, in the card type memory 1 according to the present embodiment uses an interface for controlling a serial interface, thus reducing a number of external terminals 2, which in turn reduces the size of the card type memory 1 itself, so as to define a rectangular plane having a shorter side length which is half or less than half of a longer side length. For example, the shorter side is 21.5 mm and the longer side is 50 mm.

The card type memory 1 has a plurality of indentations 3 formed at one end of the longer side direction, so as to open in one main surface 1a of the two opposing main surfaces, and external terminals 2 are formed so as to be exposed at the bottoms of the indentations 3.

It should be noted that in this card type memory 1, as has been described above, an interface control block is used for controlling a serial interface, and accordingly, 9 external terminals 2 are provided. To cope with this, three indentations 3 are formed, so that three of the external terminals 2 are formed at the bottom of each indentations 3.

That is, this card type memory 1 is inserted into an electronic apparatus in the longer side direction, so that the aforementioned external terminals 2 are electrically connected to the electronic apparatus.

Moreover, the card type memory 1 has an erroneous erase preventing member 4 at the opposite end not having the eternal terminals 2. This erroneous erase preventive member 4 is engaged with an erroneous erase preventing switch (not depicted) which is contained inside the card type memory 1 and will be detailed later. This erroneous erase preventing switch is turned ON and OFF when it is slidably moved in the shorter side direction which intersects at a right angle to the insertion direction of the card type memory 1.

Furthermore, the card type memory 1 has a lock cut-off portion 5 formed at one side lb parallel to the longer side direction, i.e., the insertion direction of the card type memory 1. The lock cut-off portion 5 is engaged with a convex formed on the electronic apparatus (not depicted) for locking so as to prevent removal of the card type memory 1 from the electronic apparatus.

Furthermore, a cut-off portion 6 is formed in the end side of the card type memory 1 having the external terminals, so as to define a slanting plane to the longer side of the insertion direction of the card type memory 1, thus preventing erroneous insertion of the card type memory 1.

Figure 3:
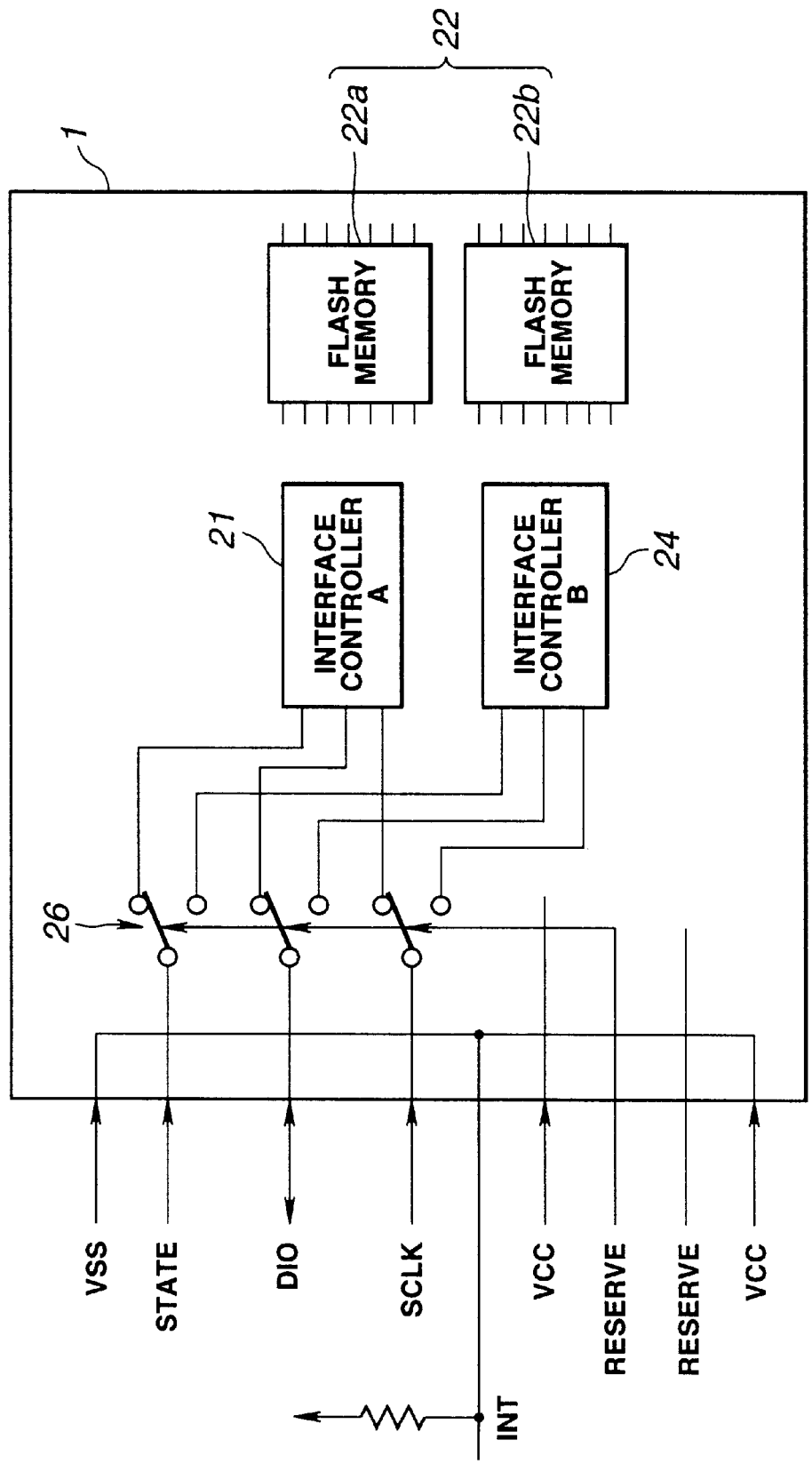
FIG. 3 is a block diagram showing a configuration of the card type memory according to the present invention.

As shown in FIG. 3, the card type memory 1 according to the present embodiment includes an interface controller A21, an interface controller B24, and storage means 22 which are all built in the card type memory 1. The storage means 22 consists of a plurality of memories such as flash memories 22a and 22b, for example, which belongs to a type of ROM (read only memory) into which a data can also be written. The interface controller A21 and the interface controller B24 are respectively connected to the flash memories 22a and 22b.

In the card type memory 1, the interface controller A21 has a built-in predetermined interface control block for controlling a predetermined serial interface, and the interface controller B24 has a built-in interface control block for controlling a serial interface of a different type from that of the aforementioned interface control block, such as USB (Universal Serial Bus) or IEEE 1394.

Furthermore, in the card type memory 1, there is provided connection means 26 for selecting one of the interface controller A21 and the interface controller B24, so as to be connected to the aforementioned electronic apparatus (not depicted).

It should be noted that the connection means 26 is controlled by the electronic apparatus (not depicted) to select the interface controller.

More specifically, the following procedure is carried out. That is, the card type memory 1 according to the present embodiment, as has been described above, uses the serial interface control block for controlling a serial interface and accordingly, has 9 signal lines including a State (status signal) line, DIO (Data In Out) line, SCLK (serial clock) line, and two signal lines reserved, which respectively correspond to the external terminals. For each of the signals lines for supplying respective signals from the electronic apparatus such as State (status signal), DIO (data in out), and SCLK (serial clock), a switch is provided to select one of the interface controller A21 and the interface controller B24. The switches constitute connection means 26. One of the two reserved signal lines from the electronic apparatus is used as a control line for switching which is controlled by a control signal specifying switching to one of the interface controller A21 and the interface controller B24.

Figure 4:
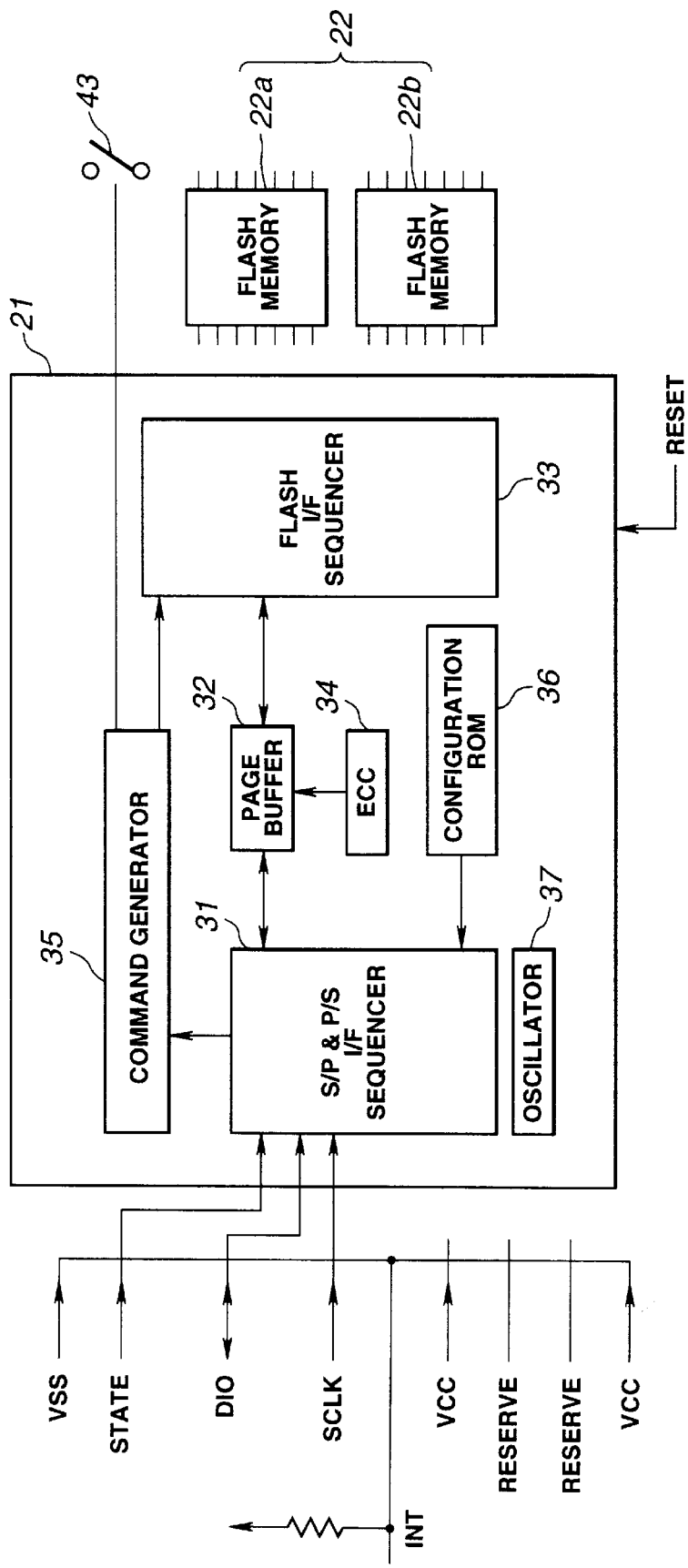
FIG. 4 is a block diagram showing an enlarged configuration of an interface controller of the card type memory according to the present invention.

Here, in the card type memory 1, the interface controller A21 or the interface controller B24 has a configuration as follows. It should be noted that here the interface controller A21 is shown as an example in FIG. 4. FIG. 4 shows an enlarged configuration of the interface controller A21.

The interface controller A21 decides whether the erroneous erase preventing switch 43 is set to recordable or disabled mode prior to writing a signal (data) supplied from an electronic apparatus (not depicted) into the storage means 22. The data is written in the storage means 22 only if the switch is set to the recordable mode.

Here, more specifically, the interface controller A21 includes: a serial/parallel—parallel/serial interface sequencer (hereinafter, referred to as an S/P & P/S sequencer) 31; a page buffer 32; a flash interface sequencer (hereinafter, referred to as a flash I/F sequencer) 33; an ECC encoder/decoder 34 for carrying out an error correction processing; a command generator 35 for generating a predetermined control command; a configuration ROM (read only memory) 36; and an oscillator 37 for supplying a clock to respective circuits.

The S/P & P/S sequencer 31 is selectively connected by connection means (not depicted) via the signal lines of State (status signal), DIO (data in out), and SCLK (serial clock) to the serial interface of the electronic apparatus. Consequently, the S/P & P/S sequencer is supplied from the electronic apparatus with the State (status signal), SCLK (serial clock), and a control data.

The S/P & P/S sequencer 31 converts a serial data supplied via the DIO (data in out) signal line from the electronic apparatus, into a parallel data in synchronization with the serial clock supplied via the aforementioned SCLK (serial clock) signal line. Among the data converted into a parallel data, the S/P & P/S sequencer 31 supplied, for example, a control data to the command generator 35 and other data to the page buffer 32.

That is, the aforementioned S/P & P/S sequencer 31 and the command generator 35 correspond to the predetermined interface control block.

The page buffer 32 is a buffer memory for storing a data supplied from the S/P & P/S sequencer 31 on page (512 bytes) basis. The data stored in the page buffer 32 is added with an error correction code by the ECC encoder/decoder 34. The page buffer 32 supplies one page data having the error correction code, via the flash I/F sequencer 33 to the flash memories 22a and 22b. Thus, a predetermined data from the electronic apparatus is written in the flash memories 22a and 22b.

Moreover, a data read out from the flash memories 22a and 22b is supplied via the flash I/F sequencer 33 to the pager buffer 32.

The pager buffer 32 stores the data from the flash I/F sequencer 33. Here, the ECC encoder/decoder 34 carries out an error correction processing according to the error correction code added to the data stored in the pager buffer 32. This page buffer 32 reads out page after another the data which has been subjected to the error correction processing and supplies the data to the S/P & P/S sequencer 31. The S/P & P/S sequencer 31 converts the data supplied from the page buffer 32, into a serial data to be transmitted to the aforementioned electronic apparatus.

the command generator 35 generates a control command according to the control data from the S/P & P/S sequencer 31. For example, if the command generator 35 is supplied with a read state register instruction for checking the operation state of the card type memory 1, the command generator 35 decides the setting content of the erroneous erase prevention switch 43 and decides whether to carry out a data writing according to the setting content.

Moreover, the command generator 35 generates a busy command indicating a state of data writing into the storage means 22 or data reading from the storage means 22, and transmits the command via the S/P & P/S sequencer 31 to the electronic apparatus. When the data writing or the data reading is complete, the command generator 35 generates a ready command and transmits the command via the S/P & P/S sequencer 31 to the electronic apparatus.

The configuration ROM 36 contains a version information and an information of an initial value of the card type memory 1. Consequently, when a connection is made between an electronic apparatus and the card type memory 1, the command generator 35 firstly reads out the aforementioned version information and the like from the configuration ROM 36 via the S/P & P/S sequencer 31 and generates a predetermined command according to the information, so as to carry out a predetermined initialization of the card type memory 1.

It should be note that in the aforementioned example, explanation has been given on the interface controller A21. The interface controller B24 has an almost identical configuration as the aforementioned interface controller A21 except for the configuration of the command generator.

That is, in the card type memory 1, the aforementioned operation is carried out by selectively connecting the electronic apparatus to the interface controller A21 and the interface controller B24.

Moreover, in the aforementioned example, explanation has been given for a case of a serial interface but the external storage apparatus according to the present invention can also be applied to a parallel interface.

Furthermore, in the aforementioned example, the flash memories are used as a memory, but in the external storage apparatus according to the present invention, it is possible to use a RAM (random access memory) capable of reading out and writing in as well as a ROM other than flash memory. in the card type memory of the aforementioned example, the storage means is connected to two interface controllers, each having an interface control block of different type, and one of the two interface controllers is selected to an electronic apparatus by connection means. Consequently, it is possible to connect without an adapter to an electronic apparatus having an interface which corresponds to one of the two interface controllers built in this card type memory.

That is, for example, it is possible to write a data from an electronic apparatus such as a still image pickup apparatus, acoustic apparatus, video apparatus or the like to the card type memory of the aforementioned example and connect the card type memory to a computer for example so that the data is read into the computer, all these without using a conversion adapter.

Furthermore, explanation has given on an example of the card type memory having two types of interface control blocks. The external storage apparatus according to the present invention can also have three ore more types of interface control blocks. In such a case, a data movement and the like is further facilitated between more electronic apparatuses.

Thus, the external storage apparatus according to the present invention enables to be connected to a plurality of electronic apparatuses having different types of built-in interfaces without using an adapter. As the conversion processing carried out by the interface between an electronic apparatus and the storage means in the external storage apparatus is identical to a conversion when these are directly connected, a high-speed access is enabled regardless of the type of the interface control block in the external storage apparatus.

What is claimed is:

1. An external storage apparatus for storing data from an electronic apparatus, comprising:
   at least one electronic memory;
   a plurality of terminals for connecting said storage apparatus to said electronic apparatus;
   interface controllers of a plurality of types for carrying out writing and/or reading of data to/from said at least one electronic memory; and
   a plurality of switches for selectively connecting said interface controllers to at least one of said plurality of terminals;
   wherein said terminals include at least one data terminal, one clock terminal, and one status terminal, and said plurality of switches are at least connected to said one data terminal, one clock terminal, or one status terminal.

2. An external storage apparatus as claimed in claim 1, wherein said plurality of switches is operable to select among said interface controllers in response to a control from said electronic apparatus.

3. An external storage apparatus as claimed in claim 1, wherein at least one of said interface controllers is a Universal Serial Bus (USB) compatible interface controller.

4. An external storage apparatus as claimed in claim 1, wherein at least one of said interface controllers is an IEEE 1394 compatible interface controller.

5. An external storage apparatus as claimed in claim 1, wherein at least one of said interface controllers is operable to effect a serial interface.

6. An external storage apparatus as claimed in claim 1, wherein at least one of said interface controllers is operable to effect a parallel interface.

7. An external storage apparatus as claimed in claim 1, wherein said electronic memory is a flash memory.

8. A memory system comprising an electronic apparatus and an external storage apparatus connected to said electronic apparatus, said external storage apparatus being operable to store data from said electronic apparatus and comprising:

at least one electronic memory;

a plurality of terminals for connecting said external storage apparatus to said electronic apparatus;

interface controllers of a plurality of types for carrying out writing and/or reading of data to/from said at least one electronic memory; and a plurality of switches for selectively connecting said interface controllers to at least one of said plurality of terminals;

wherein said terminals include at least one data terminal, one clock terminal, and one status terminal, and said plurality of switches are at least connected to said one data terminal, one clock terminal, or one status terminal.

9. A memory system as claimed in claim 8, wherein said electronic apparatus transmits to said external storage apparatus a signal for selecting one of said interface controllers; and said switches select one of said interface controllers in response to said signal.

10. A memory system as claimed in claim 8, wherein at least one of said interface controllers is a Universal Serial Bus interface controller.

11. A memory system as claimed in claim 8, wherein at least one of said interface controllers is an IEEE 1394 compatible interface controller.

12. A memory system as claimed in claim 8, wherein at least one of said interface controllers is operable to effect a serial interface.

13. A memory system as claimed in claim 8, wherein at least one of said interface controllers is operable to effect a parallel interface.

14. A memory system as claimed in claim 8, wherein said electronic memory is a flash memory.

* * * * *

UNITED STATES PATENT AND TRADEMARK OFFICE
CERTIFICATE OF CORRECTION

PATENT NO.     : 6,088,755
DATED          : July 11, 2000
INVENTOR(S)    : Toshiharu Kobayashi et al.

It is certified that error appears in the above-identified patent and that said Letters Patent is hereby corrected as shown below:

<u>Title page,</u>
Add the following under Item [56]:

-- FOREIGN PATENT DOCUMENTS

| | | |
|---|---|---|
| 2-158992 | 6/1990  | Japan |
| 4-319595 | 11/1992 | Japan |
| 5-134820 | 6/1993  | Japan |
| 8-022512 | 1/1996  | Japan |
| 9-027162 | 1/1997  | Japan -- |

Signed and Sealed this

Twenty-ninth Day of July, 2003

JAMES E. ROGAN
*Director of the United States Patent and Trademark Office*